Dec. 25, 1956     E. V. HARLOW     2,775,550

REDUCTION OF $C_1$ CARBON CONTENT IN TAR

Filed April 16, 1954     2 Sheets-Sheet 1

INVENTOR.
EARL V. HARLOW
BY Roger J. Drew
his ATTORNEY

Dec. 25, 1956  E. V. HARLOW  2,775,550
REDUCTION OF $C_1$ CARBON CONTENT IN TAR
Filed April 16, 1954  2 Sheets-Sheet 2
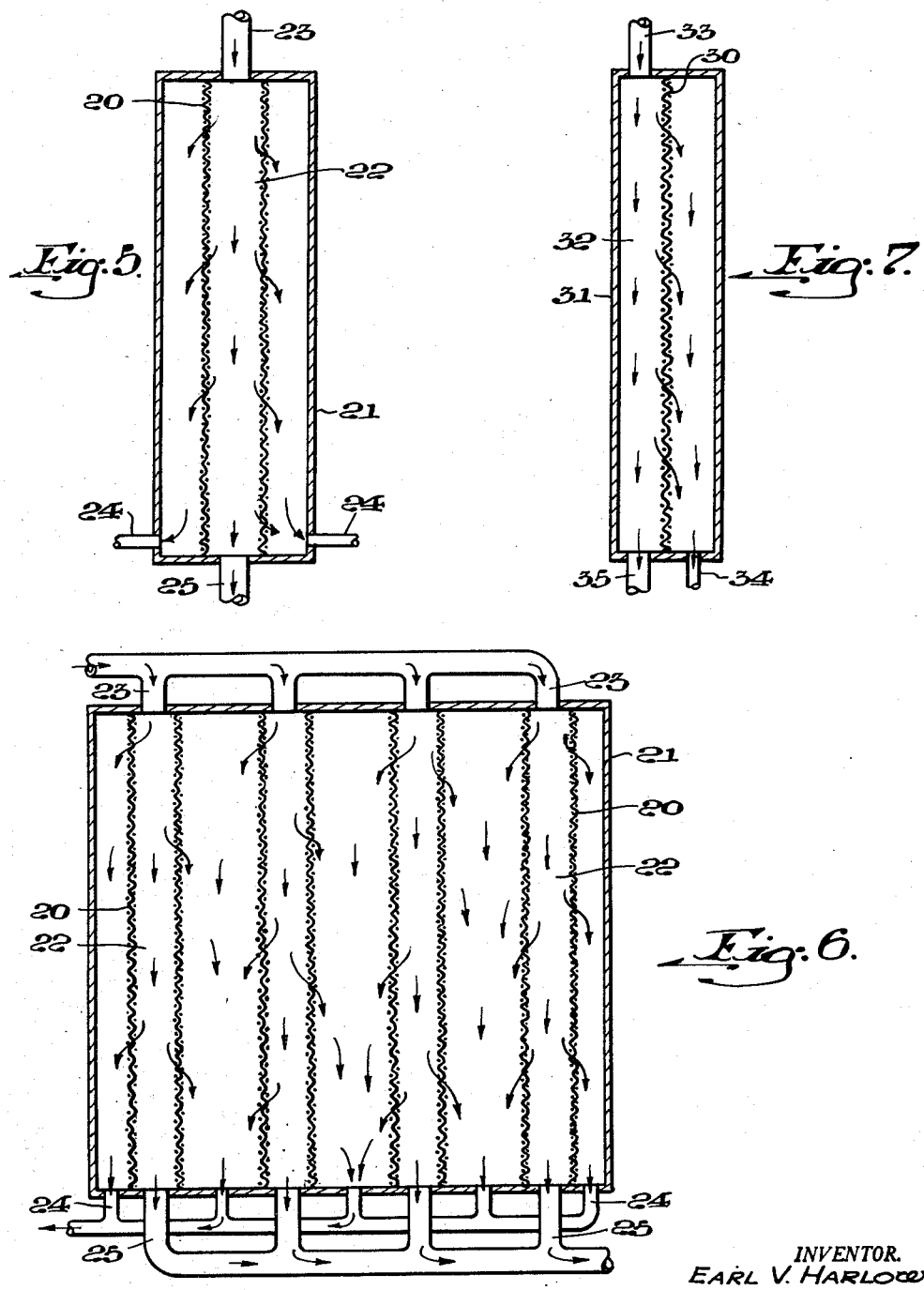
INVENTOR.
EARL V. HARLOW
BY Roger J. Drew
his ATTORNEY United States Patent Office 2,775,550
Patented Dec. 25, 1956

2,775,550

REDUCTION OF $C_1$ CARBON CONTENT IN TAR

Earl V. Harlow, Towson, Md., assignor to Koppers Company, Inc., a corporation of Delaware Application April 16, 1954, Serial No. 423,676

6 Claims. (Cl. 196—147)

This invention relates in general to the filtration of tar and more particularly to a process for the reduction of $C_1$ content of tar by filtration.

Both crude and refined tar contain minute particles in suspension therein generally ranging in size from about 0.2 to about 5 microns. These minute particles consist of pitch-like heavy hydrocarbon material at their center and change in composition and become softer as one moves toward the outside of the particle until they become almost like the surrounding liquid tar on their outer surfaces. They are insoluble in pyridine and nitrobenzene and exhibit Brownian movement, particularly the smaller size particles. They are generally known and referred to in this art as $C_1$ particles or simple as $C_1$.

A tar of low $C_1$ content or substantially free of $C_1$ has been in great demand for the production of certain tar coating and impregnating material. Heretofore extensive experimentation has been conducted in an effort to effect the removal of these $C_1$ particles from tar. Various types of commercial filters and centrifuges have been involved in this experimentation including, for example, vacuum drum filters, filter presses, leaf filters, horizontal plate filters, coil spring filters, nozzlejector centrifuges, etc. Centrifuging will only remove a portion of the $C_1$ particles from the tar. When the foregoing filters were utilized, the major problem arose from the building up of a heavy, dense filter cake on the filter medium with resultant slow flow. Removal of this heavy dense cake and building up of a new cake of desired thickness resulted in decreased capacity, loss of time, etc. This, of course, was undesirable in commercial operations inasmuch as these relays are extremely costly. Centrifuging also was unsatisfactory in that it removed only the larger carbon and other impure particles and did not efficiently remove the $C_1$ particles.

It is therefore an object of this invention to provide a process for filtering tar which will result in a tar fraction substantially free of $C_1$ particles.

Another object is to provide a process for filtering tar which will result in a fraction of a relatively high $C_1$ content.

Another object is to provide a process for tar infiltration which will be economical and advantageous from a commercial standpoint.

An additional object of this invention is to provide a process for the filtration of tar which will obviate the difficulties of the prior art.

Ancillary and additional objects and advantages will be apparent as the invention is hereinafter described in more detail.

The present invention, in its broadest aspects, comprises flowing liquified tar containing $C_1$ particles across the surface of a filter screen capable of building a thin tenacious membrane or cake predominantly of $C_1$ particles at a linear velocity of from broadly about 4 to about 16 feet per second and advantageously from about 7 to about 9 feet per second to produce a tar filtrate substantially free of $C_1$ particles.

Figure 5 discloses a longitudinal sectional view through another filtering device that can be utilized in practicing this invention.

Figure 6 is a longitudinal sectional view through a filtering device which represents a plurality of the filter screens disclosed by foregoing Figure 5 and which can also be utilized in this invention.

Figure 7 discloses another filtering device that can be employed in this invention.

Figure 1:
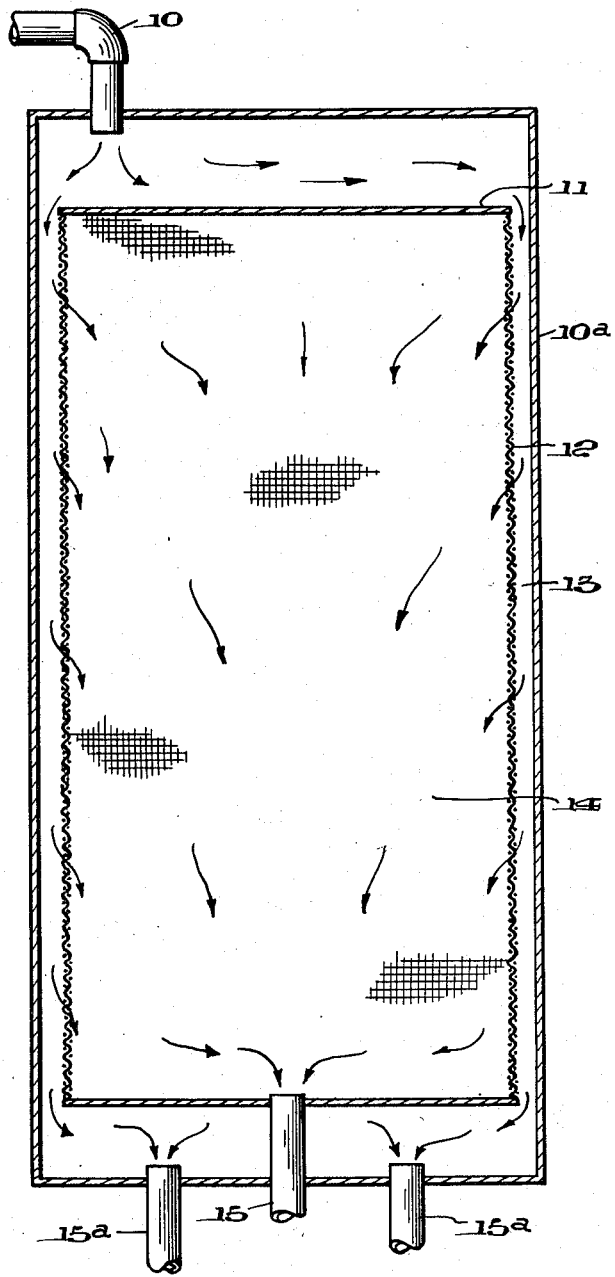
Figure 1 is a longitudinal sectional view through a filtering device having an annular zone that can be utilized in practicing this invention.

With reference now to the accompanying Figure 1, showing for purposes of exemplification an apparatus for carrying out the present invention but without limiting my invention thereto, tar containing $C_1$ particles in suspension flows into the casing 10a, prefreably by means of pumping, through line 10. This incoming tar is at a filter inlet temperature of from about 160 to about 220° C. and advantageously under a pressure at the inlet to the filter of from about 22 p. s. i. g. to about 50 p. s. i. g. (hereinafter referred to as the inlet pressure). The tar, while advantageously under pressure and within this temperature range flows through a narrow annular chamber or zone 13 of uniform width perpendicular to the filter screen, advantageously between about 0.15 and about 0.35 inch in width at a linear velocity within the aforesaid range as it passes or sweeps across the surface of a filter screen, advantageously a Dutch weave twill screen of the types hereinafter described, resulting in a portion of the tar passing through the filter screen 12 and into the inner zone 14 of the filter cartridge. The filtered, substantially $C_1$-free tar filtrate flows out through discharge line 15 and is ready for utilization. The portion of the liquid tar that does not pass through the filter screen flows out through discharge lines 15a into suitable storage tanks. If desired, discharge line 15 can be connected to a feed line of another substantially identical filtering device. This filtering device can be operatively connected to another substantially identical filtering device or to a plurality of similar filters operatively connected in series and the tar filtered as many times as desired. If desired, the tar may be continuously recycled and filtered as many times as is desired through a single filter of the type hereinbefore described.

Within a linear velocity range of from about 4 to about 16 feet per second, and advantageously from about 7 to about 9 feet per second, a thin tenacious membrane predominantly of $C_1$ particles of a substantially uniform thickness of from about .010 to about .025 inch can be maintained on the filter screen. A filter membrane or cake of a substantially uniform thickness within this range yields the most practical and effective removal of $C_1$ particles from the tar.

It is to be understood that the kinematic viscosity of the tar decreases as the temperature of the tar increases. Inasmuch as the filtration rate of a given tar is a function of the viscosity, the filtration rate of the tar increases with increased temperature. The change in viscosity with change in temperature is shown by the following table for a typical $C_1$-containing tar.

| Temperature, °C. | Kinematic Viscosity, Centistokes |
|---|---|
| 150 | 11 |
| 159 | 9.2 |
| 169 | 7.8 |
| 180 | 6.4 |
| 200 | 4.7 |
| 220 | 3.4 |

It is apparent from the foregoing table that the kinematic viscosity of the tar decreases as the temperature of the tar is increased. The filtration of the tar is improved as its temperature is increased inasmuch as the rate of filtering the tar is increased as its viscosity is decreased. It has been found that the more viscous the tar, the less tar that will pass through the filter screen of this invention in unit time. A temperature of the tar at the inlet to the filter 220° C. has been found to be advantageous from an economic standpoint, although the tar could be heated to higher temperatures (thereby becoming less viscous) if desired.

Instead of heating the tar, the viscosity of the tar can be decreased, if desired, by the addition of a solvent prior to filtration. A solvent in which the $C_1$ particles are insoluble such as, for example, heavy coal-tar naphtha, pyridine, nitrobenzene, etc., can be utilized for this purpose. The solvent can be admixed with the tar in any desired ratio such as, for example, 1:1, 2:1, by means of any conventional mixer.

During the "start-up" or initial stages of the process, the filtrate is advantageously recycled and refiltered until a filter membrane of the hereinbefore described substantially uniform thickness is built up on the filter screen. Of course, this recycle would obviously not be necessary if this initial filtrate containing a relatively higher $C_1$ content could be utilized.

The following specific examples are illustrative of the results obtainable by the operation of the instant invention but are not to be construed as limitations thereon:

Example I

Five hundred gallons of coke oven tar having a $C_1$ content of 5.8% by weight was filtered by means of the filtering device hereinbefore described in Figure 1 having an annular zone of 0.28 inch in width perpendicular to the wire cloth screen, a 20 x 250 mesh single warp, stainless steel Dutch weave twill wire cloth having a length of 10 feet, and a filtering area of 7.7 square feet. The tar was passed through the annular zone at a rate of initially 90 G. P. M., a temperature at the inlet to the filter of 160° C. and a pressure at the inlet to the filter of 22 p. s. i. g. This tar had a kinematic viscosity of 9.3 centistokes. The rate at which the tar was passed through the annular zone fell to 75 G. P. M. in the latter part of the run. The $C_1$ content of the initial 100 lbs. of filtrate was 1.26% by weight, of the next 400 lbs. of filtrate 0.31% by weight, of the next 500 lbs. of filtrate 0.00% and at the end of the run 0.00%. The tar was filtered at a rate of 0.253 gallon per hour per square foot of filter screen area. The filter cake was of a thickness of about .016 inch at the end of the run.

Example II

Five hundred gallons of coke oven tar having a $C_1$ content of 8.24% by weight was filtered by means of the filtering device substantially identical to that utilized in foregoing Example I having an annular zone of 0.35 inch in width perpendicular to the wire cloth screen. The tar was passed through the annular zone at a rate of 90 G. P. M., a temperature at the inlet to the filter of 181° C. and a pressure at the inlet to the filter of 22 p. s. i. g. This tar had a kinematic viscosity of 6.6 centistokes. The $C_1$ content of the first 100 lbs. of filtrate was 0.05%, of the next 500 lbs. of filtrate 0.00% and at the end of the run 0.00%. The tar was filtered at a rate of 0.432 gallon per hour per square foot of filter screen area. The thickness of the filter cake was about .018 inch at the end of the run.

Example III

Coke oven tar in the amount of 500 gallons and having a $C_1$ content of 8.47% by weight was filtered by means of the filtering device hereinafter described with regards Figure 6, having narrow zones of 0.26 inch in width perpendicular to the filter screens, 20 x 350 single warp, Dutch twill weave stainless steel filter screens each having a length of 10 feet, and a filtering area of each screen of 7.7 square feet. The tar was passed through the narrow zones at a rate of 90 G. P. M., a temperature at the inlet of the filter of 220° C. and a pressure at the base of the filter of 50 p. s. i. g. This tar had a kinematic viscosity of 3.5 centistokes. The $C_1$ content of the filtrate when 3.6% of the charge had been filtered was 0.85% by weight, when 18% of the charge had been filtered 0.68%, and when 36% had been filtered 0.56%. After 36% of the tar had been filtered, the filter cake was of a thickness of about .013 inch.

Example IV

Five hundred gallons of coke oven tar having a $C_1$ content of 8.51% was filtered by means of a filtering device substantially identical to the filtering device of Example I having an annular zone of 0.15 inch in width perpendicular to the wire cloth screen, a 20 x 250 mesh nickel triple warp Dutch weave twill cloth having a length of 10 feet, and a filtering area of 7.7 square feet. The tar was passed through the annular zone at a rate of 50 G. P. M., a temperature at the inlet to the filter of 200° C., and a pressure at the inlet to the filter of 22 p. s. i. g. This tar has a kinematic viscosity of 4.8 centistokes. The $C_1$ content of the filtrate when 3.9% of the tar had been filtered was 0.10% by weight, when 18% of the tar had been filtered 0.03% and after 36% of the tar had been filtered 0.04%. The filtrate rate was 0.458 gallon per hour per square foot of filter screen area. After 36% of the tar had been filtered, the filter cake was of a thickness of about .025 inch.

Example V

Five hundred gallons of coke oven tar having a $C_1$ content of 9.73% by weight was filtered using the filtering device of Example I except that the filter screen was a 325 mesh square weave stainless steel filter screen. This filtration was carried out at a temperature at the inlet to the filter of 200° C. and a pressure at the inlet to the filter of 43 p. s. i. g. The tar was passed through the annular zone at a rate of 90 gallons per minute and had a kinematic viscosity of 5.1 centistokes. The $C_1$ content of the filtrate when 4.4% of the charge had been filtered was 0.03% by weight, when 18% had been filtered 0.02% and after 36% had been filtered 0.01%. After 36% of the tar had been filtered, the filter cake was of a thickness of about .010 inch.

Example VI

Five hundred gallons of coke oven tar having a $C_1$ content of 22% by weight was filtered by means of the filtering device similar to that of Example I having a 20 x 500 single warp Dutch weave twill stainless steel filter screen of a 10 foot length, and a total filtering area of 7.7 square feet at a temperature at the inlet to the filter of 215° C. and a pressure at the inlet to the filter of 22 p. s. i. g. The tar was passed through the annular zone at a rate of 90 gallons per minute and had a kinematic viscosity of 4.4 centistokes. At the end of the run the $C_1$ content of the filtrate was 3.41% by weight. The filter cake was of a thickness of about .022 inch at the end of the run.

*Example VII*

Five hundred gallons of coke oven tar having a $C_1$ content of 9.73% by weight was filtered using the filtering device of Example I except that the filter screen was a 325 mesh square weave stainless steel filter screen. This filtration was carried out at a temperature at the inlet to the filter of 200° C. and a pressure at the inlet to the filter of 38 p. s. i. g. The tar was passed through the annular zone at a rate of 90 gallons per minute and had a kinematic viscosity of 11.3 centistokes. At the end of the run the $C_1$ content of the filtrate was 3.20% by weight. The filter cake was of a thickness of about .020 inch at the end of the run.

*Example VIII*

Five hundred gallons of coke oven tar having a $C_1$ content of 6.93% by weight was filtered by means of the filtering device employed in Example III except that the filter screens were 325 mesh square weave stainless steel screens. This filtration was carried out at a temperature at the inlet to the filter of 194° C. and a pressure at the inlet to the filter of 38 p. s. i. g. The tar was passed through the narrow zones at a rate of 50 gallons per minute and had a kinematic viscosity of 11.5 centistokes. The $C_1$ content of the filtrate when 3.8% of the charge had been filtered was 0.04% by weight, when 15% had been filtered 0.02% and after 43% had been filtered 0.01%. After 43% of the tar had been filtered, the filter cake was of a thickness of about .017 inch.

It is to be noted that this invention is not restricted to the reduction of $C_1$ content in tar from any one particular source and of any particular $C_1$ content. Obviously when tar of very high $C_1$ content is to be filtered, it may be necessary to recycle the filtrate more than once to obtain the particular $C_1$ content tar desired.

It is to be understood that apparatus different from the apparatus disclosed in Figure 1 may be employed for carrying out the process. For example, the apparatus exemplified by Figure 5 wherein two flat, rectangular filter screens 20, advantageously Dutch weave twill screens of the types hereinbefore described are disposed in a metal casing 21, or the device shown in Figure 6 wherein a plurality of flat, rectangular filter screens, advantageously of the Dutch weave twill types are positioned in a metal casing, can be employed. These filter screens 20 are positioned in the casing substantially parallel to one another to provide a narrow chamber or zone 22 of uniform width, advantageously between about 0.15 and about 0.35 inch in width perpendicular to the filter screens between the screens. The $C_1$ containing tar flows into the zone 22 through line 23, advantageously by pumping, at a filter inlet temperature of about 160 to 220° C. and advantageously under a filter inlet pressure of, for example, about 22 p. s. i. g. The heated tar then flows through the narrow zone 22 at the aforesaid linear velocities of from broadly about 4 to about 16 feet per second and advantageously from about 7 to about 9 feet per second where the tar passes or sweeps across the surface of the flat rectangular filter screens 20 resulting in a portion of the tar passing through these filter screens. The filtered, substantially $C_1$-free filtrate then flows out of the casing 21 through discharge lines 24. The portion of the liquid tar that does not pass through the filter screen flows out through discharge line 25 to storage or it can be recirculated.

The device shown by Figure 7 may also be employed in practicing the invention, if desired. In this device a flat, rectangular filter screen 30 is positioned in a metal casing 31 substantially parallel to the walls of the casing to provide a narrow zone 32 of uniform width, advantageously between about 0.15 and about 0.35 inch in width perpendicular to the filter screen between the screen 30 and the wall of the casing 31. The $C_1$-containing tar flows into the narrow zone 32 through line 33 at the aforesaid filter inlet temperature of about 160 to about 220° C. and advantageously under a filter inlet pressure of, for example, about 22 p. s. i. g. The heated tar then flows through the narrow zone 32 at the aforesaid linear velocities of from broadly about 4 to about 16 feet per second and advantageously from about 7 to about 9 feet per second where the tar passes or sweeps across the surface of the flat, rectangular filter screen 30 resulting in a portion of the tar passing through the filter screen. The filtered, substantially $C_1$-free filtrate then flows out of the casing through line 34. The remaining liquid tar that does not pass through the filter screen flows out through discharge line 35 or it can be recirculated. The $C_1$-containing tar can also be filtered by a plurality of the units disclosed in Figure 7, if desired.

Filter screens which can be employed for carrying out this process include, for example, Dutch weave twill screens, from about 325 to about 400 mesh square weave screens, etc. A Dutch weave twill screen of stainless steel has been found to be particularly advantageous for filtering hot tar. However, filter screens manufactured of nickel can be utilized, if desired. A screen size of 20 x 250 of either single or triple warp Dutch weave twill has been found to be eminently adapted for plant operations. Other Dutch weave twill screens that can be employed are, for example, 28 x 350, 20 x 350, and 28 x 500 single warp Dutch weave twill screens.

Obviously other filter screens can be employed in this invention that give a resistance to the flow of $C_1$ particles therethrough equivalent to that obtained with the filter screens utilized herein.

It is to be understood that filter screens of larger screen sizes than the filter screens hereinbefore disclosed can be utilized in practicing this invention if desired. It might take longer to build up the thin tenacious membrane of predominantly $C_1$ particles on these larger size screens than when the previously-disclosed filter screens are employed. However, in order to expedite the build-up of the thin tenacious membrane on these larger size filter screens, "dirty" tar or tar containing an extremely high concentration of $C_1$ particles could be first passed through the filter screen.

Figure 2:
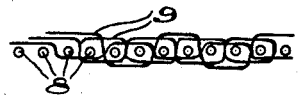
Figure 2 is an enlarged transverse sectional view of a single warp Dutch weave twill filter screen that can be used as the filter screen in the filtering apparatus shown in Figures 1, 5, 6, and 7.
Figure 3:
Figure 3 represents an enlarged fragmentary detail view of a single warp Dutch weave twill filter screen that can be employed in the filtering apparatus exemplified by Figures 1, 5, 6, and 7.
Figure 4:
Figure 4 represents an enlarged fragmentary detail view of a triple warp Dutch weave twill filter screen that can be employed in the filtering apparatus disclosed in Figures 1, 5, 6, and 7.

As is disclosed by Fig. 2, a Dutch weave twill screen is characterized by having each woof strand 9 alternately pass under two and then over two of the warp strands 8. Each woof strand commences passing under two and over two warp strands one warp strand behind or ahead of the woof strand immediately beside it so that the apertures in the screen are patterned in straight lines which run diagonally across the screen. Fig. 3 discloses a single warp Dutch weave twill screen having 20 single warp strands 8 to the inch and 250 single woof strands 9 to the inch running at right angles thereto. Fig. 4 exemplifies a triple warp Dutch weave twill screen having 20 triple warp strands 7 to the inch and 250 single woof strands 9 to the inch disposed at right angles thereto. In each filter screen, however, the warp strands are advantageously concentric with the walls of the filter cartridge instead of running parallel to the longitudinal axis of the cartridge as it has been found in the latter case that this often results in uneven membranes or cakes.

The following table sets forth the diameter of the warp strands and woof strands of single warp Dutch weave twill screens:

|  | Diameter of Warp Strand, Inches | Diameter of Woof Strand, Inches |
| --- | --- | --- |
| 20 x 250 | .010 | .0082 |
| 20 x 350 | .010 | .0065 |
| 28 x 500 | .0085 | .0045 |

The 400 mesh square weave filter screen which has 400 woof and warp strands to the inch is characterized by having a woof strand pass alternately under one and over one warp strand, the remaining woof strands passing alternately over one and under one warp strand and under one and over one warp strand. Unlike the Dutch weave twill screen, each woof strand is woven in the foregoing manner commencing with the same warp strand as does the woof strand immediately beside it. The 325 mesh square weave filter screen is characterized by having 325 woof and warp strands to the inch and is manufactured in a substantially identical manner as the 400 mesh square weave screen. The following table sets forth the size of the sieve openings and the diameter of the strands by a 325 mesh square weave and a 400 mesh square weave screen:

|  | Sieve Opening Size in Millimeters | Diameter of Strand, Inches |
|---|---|---|
| 325 mesh | .043 | .0014 |
| 400 mesh | .038 | .0010 |

When the tar being filtered is liquified by means of one of the previously disclosed solvents and not heat liquified, the foregoing filter screens can be manufactured of synthetic fibers, glass and other materials inert and insoluble to the tar media instead of a metal such as stainless steel, nickel, etc.

There is theoretically no lower limit to the width of the zone through which the liquified tar is passed. However, if this zone is less than about 0.15 inch in width perpendicular to the filter screen, it occasionally will be so narrow in width at certain points that plugging will occur. This is due to frequent inaccuracy in the fabrication of the filter screen. Additionally the pressure drop becomes so high when zones less than about 0.15 inch in width are employed that power consumption is increased considerably. It is therefore desirable from a practical standpoint to pass the liquified tar through a zone at least about 0.15 inch in width perpendicular to the filter screen. However, the zone may be of a width substantially larger than 0.35 inch as long as the rate of the tar passing through this zone is sufficient to provide a linear velocity of from broadly about 4 to about 16 feet per second, and advantageously from about 7 to about 9 feet per second as it passes or sweeps across the surface of the filter screen.

The incoming tar may be under any desired inlet pressure as long as the pressure is sufficient to force the tar through the system, and the material of which the particular filter device being used is manufactured is of sufficient strength to withstand the pressure. Therefore, inlet pressures ranging up to 100 pounds per square inch and even higher pressures can be employed in apparatus designed to withstand the pressure.

It is to be understood that the length of the filter screen utilized in this invention is variable and can be adjusted or varied in accordance with the particular "through-put" of tar desired.

The instant process is particularly advantageous from a commercial standpoint in that it produces two types of tar, both of which are of considerable commercial importance. The portion of the tar that passes through the filter screen is the low $C_1$ content tar, and the portion that does not pass through and the filter cake is the high $C_1$ content tar.

The process of the instant invention is highly advantageous in that it is a continuous process (although it may be carried out batchwise, if desired) and therefore very desirable for commercial operations. The filtrate having the low $C_1$ content is highly suitable for impregnating and coating certain articles which require a tar or pitch having a low $C_1$ content in order to produce a smooth coating thereon. The high $C_1$ content of the tar not passing through the screen renders it useful as a binder for several commercially important operations.

The invention claimed is:

1. In a process of filtering tar to provide a tar filtrate substantially free of $C_1$ particles the step which comprises: flowing liquified tar at a linear velocity of from about 4 to about 16 feet per second across the surface of a filter screen to build and maintain a thin, tenacious membrane of $C_1$ particles thereon, the tar flowing across and not through the screen having an increased amount of $C_1$ particles and the tar which flows through the screen having a decreased amount of $C_1$ particles.

2. In a process of filtering tar to provide a tar filtrate substantially free of $C_1$ particles, the step which comprises: flowing liquified tar at a linear velocity of from about 7 to about 9 feet per second across the surface of a filter screen to build and maintain a thin, tenacious membrane of $C_1$ particles thereon, the tar flowing across and not through the screen having an increased amount of $C_1$ particles and the tar which flows through the screen having a decreased amount of $C_1$ particles.

3. A process in accordance with claim 1 wherein the filter screen is a Dutch weave twill filter screen.

4. A process in accordance with claim 1 wherein the filter screen is a square weave filter screen of from about 325 to about 400 mesh.

5. A process in accordance with claim 2 wherein the filter screen is a Dutch weave twill filter screen.

6. A process according to claim 2 wherein the filter screen is a square weave filter screen of from about 325 to about 400 mesh.

References Cited in the file of this patent

UNITED STATES PATENTS

| 1,279,611 | Timmins | Sept. 24, 1918 |
| 1,355,099 | Weiss | Oct. 5, 1920 |
| 1,877,157 | Cannon | Sept. 13, 1932 |
| 2,462,604 | Boucher | Feb. 22, 1949 |

FOREIGN PATENTS

| 337,539 | Great Britain | Nov. 6, 1930 |